Oct. 24, 1944.   L. R. SIMMONS   2,360,903
VEHICLE
Filed Nov. 3, 1942
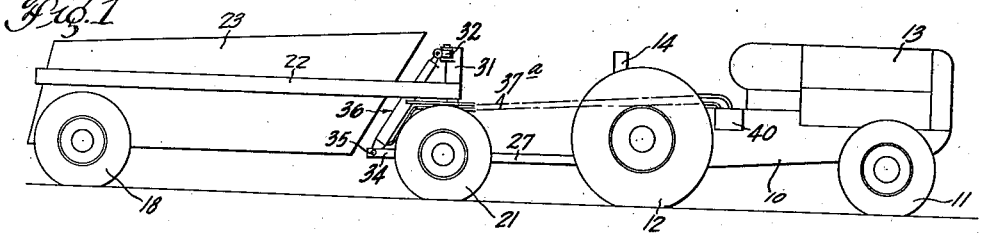
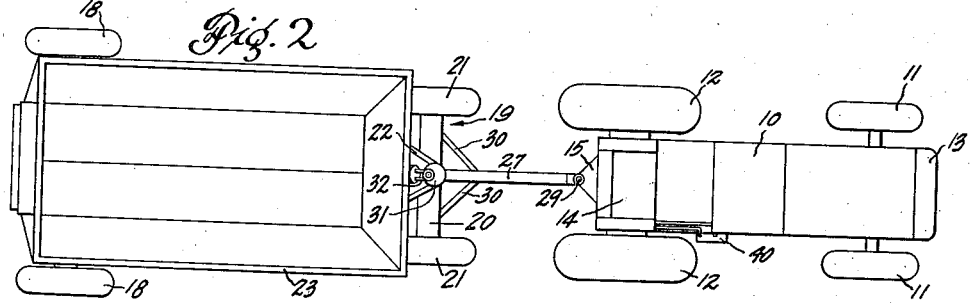
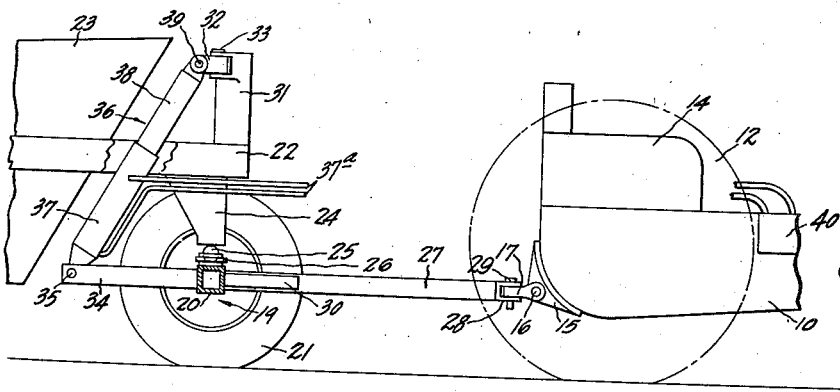
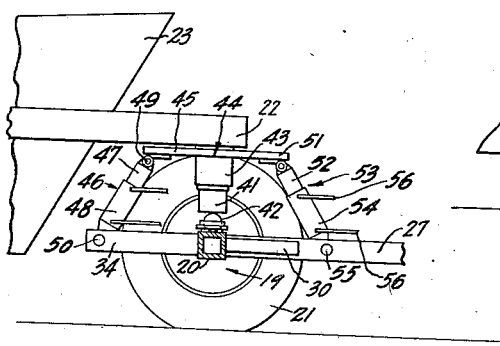
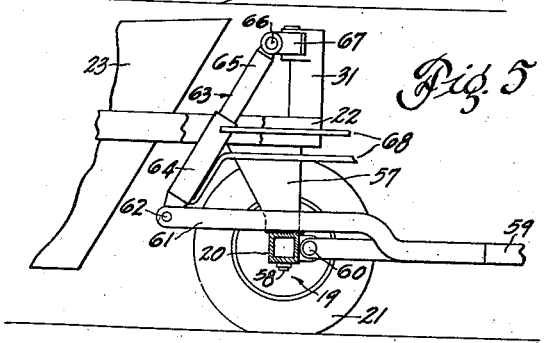
Inventor
Lovel R. Simmons
By
Attys.

Patented Oct. 24, 1944

2,360,903

UNITED STATES PATENT OFFICE 2,360,903

VEHICLE

Lovel R. Simmons, Jackson, Miss.

Application November 3, 1942, Serial No. 464,354

20 Claims. (Cl. 280—33.5)

GENERAL STATEMENT OF THE INVENTION

This invention relates to vehicles and more particularly to a vehicle train represented generally by a tractor-trailer unit or the like.

The invention seeks to provide improvements in articulately connected vehicles, particularly with respect to the increasing of the tractionability of the draft or power vehicle. A desirable means for accomplishing this result consists in the provision of mechanism by which part of the weight of the trailing vehicle is transferred temporarily to the draft vehicle. This method and the means provided thereby eliminate the use of wheel weights or the like on the draft vehicle. The design permitted by the application of the principles of the invention obviates the necessity of using semi-trailer units, which are usually characterized by a heavy duty draft vehicle capable of carrying the superimposed load of the trailer at all times. This is undesirable because the increased traction following from the superimposition of load is not needed at all times. According to the present invention, means are provided for superimposing part of the load only when needed.

Stated generally, the invention provides improvements of the type disclosed and claimed in my copending application Serial No. 413,550, filed October 3, 1941.

STATEMENT OF THE OBJECTS OF THE INVENTION

The principal object of the invention is to provide means in an articulate vehicle unit for shifting one vehicle with respect to the other, and particularly to provide means for moving one vehicle vertically with respect to the other whereby the ground supports of the vertically moved vehicle are at least temporarily relieved of at least part of the weight of the vehicle, at least part of this weight being transferred to the other vehicle.

Another object of the invention is to provide a member between the draft vehicle and the trailing vehicle and connected thereto and operated by force-exerting means in such a manner as to raise one vehicle with respect to the other.

Other objects are to utilize the draft member as the vehicle raising member; to locate the force-exerting means rearwardly of the front ground support of one vehicle; to utilize as a force-exerting means a two-way expansible and contractible pressure device; and in a modification of the invention to employ two force-exerting devices for the shifting of a vehicle.

DESCRIPTION OF THE FIGURES

Other objects and desirable features of the invention will become apparent as the disclosure is more fully made in the following detailed description and accompanying sheet of drawing, in which:

Figures 1 and 2 are respectively side and plan elevational views of a vehicle unit embodying one form of the invention;

Figure 3 is an enlarged view of portions of a tractor and a trailer connected together and embodying the invention shown in Figures 1 and 2;

Figure 4 is a view of the front portion of a trailing vehicle embodying a modified form of the invention; and Figure 5 is a similar view embodying a further modification of the invention.

Description of Figures 1, 2, and 3

Although the present disclosure refers to a vehicle unit comprising a tractor and trailer, it will be understood that the principles of the invention are similarly applicable to vehicle units of other types, and that the tractor unit may be replaced by any equivalent draft vehicle, and the trailing vehicle may, instead of being a hauling vehicle, be a scraper or other vehicle adapted to be pulled or pushed or otherwise propelled by a power unit.

Referring now to Figure 1, the draft vehicle is shown as a tractor having a main body 10 carried on front wheels 11 and rear wheels 12 and having at its forward end a conventional form of hood and radiator structure enclosing the power plant of the vehicle. The rear portion of the body 10 is provided with an operator's station 14.

As best shown in Figure 3, the body 10 has provided at its rear end a connecting bracket 15, on which is pivoted on a transverse axis, as by a pin 16, a rearwardly extending draft connection 17.

The trailing vehicle is provided with rear supporting wheels 18 and a steerable front axle structure 19. The axle structure includes a transverse axle 20 and transversely spaced wheels 21. The wheels 18 and 21 support a longitudinally extending frame 22, which in turn carries a trailer body 23.

The front end of the frame 22 converges and at its under portion is rigidly secured to a supporting structure in the form of a vertical column 24. The lower end of the column is provided with means providing a ball and socket connection with the axle 20, this means including a ball 25 on the column 24 and socket structure 26 on the upper face of the axle 20. The ball and socket structure thus mounts the front axle structure 19 on the trailer frame for steering movement about a vertical axis, for oscillation about a transverse axis and for oscillation about a longitudinal axis, so that the trailer may be steered and the wheels 21 may follow varying ground contour.

The tractor and trailer are interconnected for travel together by means providing a hitch or draft member 27. The forward end of the draft member is provided with a clevis 28 connected by a pin 29 to the hitch member 17 of the hitch bracket 15. The transverse pivot pin 16 thus mounts the forward end of the member 27 on the tractor for vertical movement about a transverse axis, and the pin 29 mounts the member 27 for movement laterally about a vertical axis. In the form of the invention shown in Figures 1, 2, and 3, the rear end of the hitch member 27 is rigidly secured to the axle 20 and is suitably braced by braces 30. The relationship between the draft member and the two vehicles is such that the member is capable of steering the front axle structure 19 of the trailer, and the member also has movement about a generally transverse axis with respect to the trailer, this movement being permitted by the ball and socket structure 25—26.

The upper forward portion of the trailer frame 22 rigidly carries an upstanding support 31 having at its upper end a connecting element in the form of a U-shaped member 32. This member is mounted at the upper end of the support 31 on a vertical pivot pin 33, thus providing for lateral swinging of the member 32 about a vertical axis substantially coaxial with and above the vertical steering axis provided by the ball and socket connection between the column 24 and the front axle 20. Stated otherwise, the element or member 32 is laterally swingable comparable to steering of the front wheel structure of the trailer.

The front axle structure 19 includes as part thereof part of the means for shifting one vehicle with respect to the other. This means includes a rearwardly extending member 34 rigidly secured to the transverse front axle 20. The member 34 provides in effect a lever arm extension of the draft member 27 and may, as a matter of fact, be provided as an integral part of said member. The rear end of the draft member extension or member 34 is provided with a transverse connecting pin 35, which carries one end of a force-exerting means in the form of a two-way fluid-pressure device 36. The force-exerting means includes a cylinder 37 and a piston 38. The cylinder is connected to the connecting pin 35 on the member 34, the assembly inclining forwardly and upwardly behind the front axle structure and the upper end of the piston 38 being connected by a pin 39 to the laterally swingable connecting element 32 at the upper end of the support 31.

The cylinder 37 is supplied with fluid at its opposite ends by fluid lines 37a, these lines being connected in any suitable manner with an appropriate fluid pump mounted on the tractor. Such pump is represented generally by the reference character 40 and may be powered in the usual manner by part of the driving mechanism of the tractor.

*Description of Figure 4*

This figure shows a modified form of the invention just described. The trailer and draft member structure are the same, and accordingly, similar reference characters are employed. In this form of the invention, a pair of force-exerting means is utilized to move the draft member 27 vertically. The vertical column 24 is replaced by a vertical column 41 having at its lower end a ball and socket connection 42 with the front axle 20. The upper portion of the column 41 is provided with a bearing which carries rotatably thereon on a vertical axis a sleeve 43 of a laterally swingable support or connecting element 44. Suitable bearings are provided between the column 41 and the element 44 to mount the element for swinging about a vertical axis coincident with the vertical axis about which the front wheel structure is steerable.

A portion of the element 44 extends rearwardly, as at 45, to provide a connecting portion for the upper end of a force-exerting device 46. This device preferably comprises a two-way fluid-pressure cylinder and piston, the piston being indicated at 47 and the cylinder at 48. The piston is connected by a pivot pin 49 to the connecting portion 45 of the element 44, and the cylinder is connected by a pin 50 to the draft member extension or member 34. A forwardly extending portion of the element 44 provides at 51 a connection for a piston 52 of a second force-exerting means 53. This means also includes a cylinder 54, which is connected by a pin 55 to a portion of the draft member spaced forwardly of the front axle 20 of the trailer. It will thus be seen that when the front axle is steered about the vertical axis of the ball and socket joint 42, the force-exerting means 46 and 53 are carried therewith, this result being permitted because of the rotatable mounting of the element 44. The cylinders 48 and 54 may be supplied with fluid under pressure through the fluid lines 56.

*Description of Figure 5*

The trailer shown in Figure 5 is substantially similar to that shown in Figure 1, and similar reference characters designate corresponding parts. In this instance, the front end of the trailer is supported on the front wheel structure 19 by means of a vertical column 57 having at its lower end a vertical pivot pin 58, which is connected to the front axle 20 and provides for steering of the front wheels 21. A member, such as a draft member 59, is connected at its rearward end to the front axle 20 by means of a transverse pivot pin 60, thus providing for vertical movement of the member 59 with respect to the trailer about a transverse axis.

The draft member includes rigidly thereon a rearwardly extending lever arm extension 61 passing over the front axle 20 and having at its rearward end a connecting pin 62 for the connection to the extension of the lower end of a force-exerting device 63. This device, like the device 36 of Figure 1, includes a two-way fluid-pressure cylinder 64 and piston 65. The cylinder is connected to the lever arm extension 61 of the draw-bar by means of the connecting pin 62, and the piston is connected at its upper end by a pin 66 to a swingable member 67 at the upper end of the support 31. The member 67 provides a connecting element identical to that shown at 32 in Figures 1, 2, and 3. The cylinder 64 may be supplied with fluid under pressure through fluid lines 68. These lines may be suitably connected to a fluid pump, such as that indicated at 40 in Figures 1, 2, and 3.

OPERATION

In the operation of the vehicle unit shown in Figures 1, 2, and 3, the tractor is driven in the usual manner to draw the trailer. Under ordinary circumstances, the tractor has sufficient power and is able to obtain sufficient traction to draw the trailer easily. However, under certain other circumstances, ground conditions are such that the tractor wheels slip and traction is lost. As heretofore stated, it is known that tractionability can be increased by the addition of weight to the tractor. According to the present invention, the addition of the necessary weight is supplied by a transfer or shift of weight from the trailer to the tractor. In the instant case this transfer of weight is accomplished by actuation of the force-exerting means 36. Fluid is supplied by the pump 40 through the upper line 37a to the upper portion of the cylinder 37, so that the piston 38 is drawn downwardly into the cylinder, thus resulting in a shortening of the distance between the connecting points 35 and 39. In other words, this distance is contracted, and the rear end of the draft member, in the form of the extension 34, is pivoted upwardly about the ball and socket connection 25—26. It follows that the forward end of the draft member is urged downwardly, and as the front end of the trailer is thus raised, the front wheels 21 are relieved of part of the weight of the trailer, and this weight is transferred through the member 27 to the rear portion of the tractor. In this manner, sufficient weight is shifted to the tractor to enable the tractor drive wheels 12 to obtain sufficient traction to overcome temporary difficulties. After ground conditions have improved, the fluid in the cylinder may be released and the vehicles restored to normal operating positions.

It is desirable that the fluid pump and fluid lines be so arranged with respect to the cylinder as to permit free floating of the piston and cylinder with respect to each other as varying ground contour is encountered. In this manner, the disposition of the force-exerting means 36 does not interfere with free travel of the trailer. Because of the connection of the element 32 at 33 on the support 31, steering of the trailer is not interfered with by the force-exerting means 36, the connections being such as to permit free lateral swinging of the necessary structure.

Since the fluid-pressure device 36 is of the two-way type, the cylinder may be operated to extend the distance between the connecting points 35 and 39, with the result that the rear end of the draft member is urged downwardly about the ball and socket 25—26, the forward end of the draft member being raised upwardly. This permits an elevation of the rear end of the tractor, which may be desirable in certain cases, such as required during the changing of a tractor tire or wheel.

The operation of the modification shown in Figure 4 is very similar to that just described. However, contraction of the force-exerting means 46 may be assisted by expansion of the force-exerting means 53 for drawing upwardly the rear end of the draft member 27. Similarly, contraction of the device 53 is assisted by expansion of the device 46 when it is desired to raise the forward end of the draft member 27. Of course, the devices 46 and 53 may also be operated individually. The disposition of the force-exerting means 46 and 53 and their connection to the connecting element 44 are such as to permit free lateral swinging of the front wheel structure 19 during steering thereof. As stated above in connection with the description of Figures 1, 2, and 3, the force-exerting devices 46 and 53 do not interfere with oscillation of the front wheel structure 19.

The operation of the structure shown in Figure 5 is substantially identical to that in Figures 1, 2, and 3. In this case the draft member 59 and its lever arm extension 61 are moved upwardly and downwardly about the pivot connection 60 of the draft member with the front axle 20. Other characteristics of the structures accord with those of the structures previously described.

It will be understood that various features of the different modifications may be interchanged as desired. Various other alterations and modifications will undoubtedly suggest themselves to those skilled in the art. It will be appreciated, however, that these may be made without a departure from the spirit and scope of the invention as defined in the appended claims.

What is claimed is:

1. In combination: a tractor having wheels; a trailer having a front axle structure including wheels supporting the trailer; means connecting the axle structure to the trailer for movement generally about transverse and vertical axes; a draft member connected at its front end to the tractor generally on a transverse axis and connected at its rear end to the axle structure; means extending behind the axle structure and providing in effect a lever arm extension of the draft member; a connecting portion on the trailer spaced from the lever arm extension; and means contractible between said lever arm extension and the connecting portion of the trailer for drawing the lever arm extension and axle structure upwardly to relieve the front wheels of the trailer of at least part of the weight of the trailer and to transfer at least part of the weight of the trailer to the tractor.

2. In combination: a tractor having wheels; a trailer having a front axle structure including wheels supporting the trailer; means connecting the axle structure to the trailer for movement generally about transverse and vertical axes; a draft member connected at its front end to the tractor generally on a transverse axis and connected at its rear end to the axle structure; means extending behind the axle structure and providing in effect a lever arm extension of the draft member; a connecting portion on the trailer spaced from the lever arm extension; and expansible and contractible means between said connecting portion and the lever arm extension of the draft member, said means being contractible to draw the lever arm extension upwardly for raising the trailer with respect to the tractor, and said means being expansible to move the lever arm extension downwardly to raise the tractor with respect to the trailer.

3. In combination: a first vehicle; a second vehicle; a member connected at a forward portion to the first vehicle for movement with respect thereto generally about a transverse axis; connecting means between a rear portion of the member and the second vehicle permitting movement of the draft member with respect to the second vehicle generally about a transverse axis; means providing in effect an extension of the member rearwardly of the aforesaid connecting means; a connecting portion on the second vehicle; and means connected between said connecting portion and the extension of the member for moving the member upwardly to raise the second vehicle with respect to the first vehicle and downwardly to raise the first vehicle with respect to the second vehicle.

4. In combination: a first vehicle; a second vehicle steerable and having a steering gear member movable to steer the same; a draft member connected at a forward portion to the first vehicle for movement with respect thereto generally about a transverse axis; connecting means between a rear portion of the draft member and the second vehicle permitting universal pivotal movement of the draft member with respect to the second vehicle and including a connection with said steering gear member to impart steering movement thereto when said draft member is swung horizontally; means providing in effect an extension of the draft member rearwardly of the aforesaid connecting means; a connecting portion on the second vehicle; and means connected between said connecting portion and the extension of the member for moving the rear portion of said draft member vertically to raise one of the vehicles with respect to the other.

5. In combination: a first vehicle; a second vehicle steerable and having a steering gear member movable to steer the same; a draft member connected at a forward end to the first vehicle for movement with respect thereto generally about a transverse axis; connecting means between a rear portion of the draft member and the second vehicle permitting universal pivotal movement of the draft member with respect to the second vehicle and including a connection with said steering gear member to impart steering movement thereto when said draft member is swung horizontally; means providing in effect an extension of the draft member rearwardly of the aforesaid connecting means; a connecting portion on the second vehicle; and means including a two-way fluid pressure device connected between said connecting portion and the extension of the extension means for moving such extension means upwardly to raise the second vehicle with respect to the first vehicle and downwardly to raise the first vehicle with respect to the second vehicle.

6. In combination: a first vehicle; a second vehicle adjacent the first vehicle, said second vehicle being steerable and having a steering gear member movable to steer the same; means providing a draft and lever element having a first end universally articulately connected to the first vehicle for pivotal movement with respect to the vehicles and universally articulately connected intermediate its ends with the second vehicle and with said steering gear member for operating the steering gear when swung horizontally; and means connected between the second end of said draft and lever element and a portion of the second vehicle for moving the member to shift one vehicle with respect to the other.

7. In combination: a first vehicle and a second vehicle; a lever element pivoted intermediate its ends on the second vehicle and having a first portion extending at one side of the axis toward the first vehicle and a second portion extending at the other side of said axis; pivot means connecting the first portion of the lever element to the first vehicle; first force-exerting means connected between said first portion and the second vehicle at one side of the first axis; and second force-exerting means connected between the second portion of the lever element and the second vehicle, one force-exerting means being expansible and the other being contractible to pivot the lever element for shifting one vehicle with respect to the other.

8. In combination: a first vehicle and a second vehicle; a lever element pivoted intermediate its ends on a transverse axis to the second vehicle and having a first portion extending at one side of the axis toward the first vehicle and a second portion extending at the other side of said axis; means connecting the first portion of the lever element to the first vehicle for movement generally about a transverse axis; first force-exerting means connected between said first portion and the second vehicle at one side of the first axis; and second force-exerting means connected between the second portion of the lever element and the second vehicle, one force-exerting means being expansible and the other being contractible to move the lever element vertically for raising one vehicle with respect to the other.

9. In combination: a first vehicle and a second vehicle including steerable ground-engaging means; a lever element pivoted intermediate its ends on a transverse axis to the second vehicle and having a first portion extending at one side of the axis toward the first vehicle and a second portion extending at the other side of said axis; means connecting the first portion of the lever element to the first vehicle for movement generally about a transverse axis; a connecting element mounted on the second vehicle for lateral swinging comparable to the steering of the swinging ground-engaging means; first force-exerting means connected between said first portion and the connecting element at one side of the first axis; and second force-exerting means connected between the second portion of the lever element and the connecting member, one force-exerting means being expansible and the other being contractible to move the lever element vertically for raising one vehicle with respect to the other.

10. In combination: a first vehicle; a second vehicle having ground-engaging means arranged for lateral steering swinging as the second vehicle changes direction; a member extending between the vehicles, said member being connected at its forward end to the first vehicle for vertical movement with respect to the first vehicle generally about a transverse axis; connecting means between an intermediate portion of the member and the second vehicle permitting movement of the member with respect to the second vehicle generally about a transverse axis and causing such steering swinging of the ground engaging means pursuant to lateral swinging of said member, the rear portion of the member extending rearwardly of said connecting means; a connecting element mounted on the trailer for lateral swinging generally comparable to the lateral swinging of the ground-engaging means; and means connected between the connecting element and the aforesaid rear portion of the member for moving said member vertically to raise one vehicle with respect to the other.

11. In combination: a first vehicle; a second vehicle having ground-engaging means arranged for lateral swinging as the second vehicle changes direction; a member connected at its forward end to the first vehicle for vertical movement with respect to the first vehicle generally about a transverse axis; connecting means between an intermediate portion of the member and the second vehicle permitting movement of the member with respect to the second vehicle generally about a transverse axis, the rear portion of the member extending rearwardly of said connecting means; a connecting element mounted on the trailer for lateral swinging generally comparable to the lateral swinging of the ground-engaging means; first force-exerting means connected between the connecting element and a portion of the member ahead of the aforesaid connecting means; and second force-exerting means connected between the connecting element and the aforesaid rear portion of the member; and means for operating said last-named means individually or together for moving said member vertically to raise one vehicle with respect to the other.

12. In combination: a first vehicle; a second vehicle having ground-engaging means including a vertical steering pivot; a member connected at its forward end to the first vehicle for vertical movement with respect to the first vehicle generally about a transverse axis; connecting means between an intermediate portion of the member and the second vehicle permitting movement of the member with respect to the second vehicle generally about a transverse axis, the rear portion of the member extending rearwardly of said connecting means; a connecting element mounted on the trailer for lateral swinging about a vertical axis substantially alined with the steering pivot of the ground-engaging means; and means connected between the connecting element and the aforesaid rear portion of the member for moving said member vertically to raise one vehicle with respect to the other.

13. In combination: a first vehicle; a second vehicle having a wheeled support; means mounting the wheeled support on the second vehicle, including a generally vertical pivot permitting lateral swinging of the wheeled support; a connecting element associated with said mounting means and mounted for lateral swinging about a vertical axis generally alined vertically with said vertical pivot; a member connected at its forward end to the first vehicle for movement with respect thereto generally about a transverse axis; connecting means between an intermediate portion of said member and the second vehicle for movement of the member with respect to the second vehicle generally about a transverse axis; means disposing said member for movement generally about the axis of the aforesaid vertical pivot, a rear portion of said member extending rearwardly of the connecting means; and means connected between the rear portion of the member and the aforesaid connecting element for moving said member vertically to raise one vehicle with respect to the other.

14. In combination: a first vehicle; a second vehicle having a wheeled support; means mounting the wheeled support on the second vehicle, including a generally vertical pivot permitting lateral swinging of the wheeled support; a connecting element associated with said mounting means and mounted for lateral swinging about a vertical axis generally alined vertically with said vertical pivot; a member connected at its forward end to the first vehicle for movement with respect thereto generally about a transverse axis; connecting means between an intermediate portion of said member and the second vehicle for movement of the member with respect to the second vehicle generally about a transverse axis; means disposing said member for movement generally about the axis of the aforesaid vertical pivot, a rear portion of said member extending rearwardly of the connecting means; first force-exerting means connected between the rear portion of said member and the aforesaid connecting element; and second force-exerting means connected between said connecting element and an intermediate portion of the member ahead of the transverse axis of the aforesaid connecting means, one force-exerting means being expansible and the other being contractible to move the member vertically for raising one vehicle with respect to the other.

15. In combination: a first vehicle; a second vehicle having a front axle structure including wheels; means mounting the axle structure on the second vehicle for steering; a member pivoted at its forward end on a transverse axis on the first vehicle; means pivoting an intermediate portion of the member on the second vehicle front axle structure on a transverse axis, a rear portion of the member extending behind the axle structure; a support on the second vehicle above the axle structure and including an element mounted for lateral swinging comparable to the steering of the axle structure; and force-exerting means rearwardly of the axle structure and connected between the rear portion of the member and the element of the support for moving the member vertically.

16. In combination: a first vehicle; a second vehicle having a front axle structure including wheels; a member pivoted at its forward end on a transverse axis on the first vehicle; means pivoting an intermediate portion of the member on the second vehicle front axle structure on a transverse axis, a rear portion of the member extending behind the axle structure; a support on the second vehicle above the axle structure; and force-exerting means rearwardly of the axle structure and connected between the rear portion of the member and the support for moving the member vertically.

17. In combination: a first vehicle; a second vehicle having a wheeled support; a member connected at its forward end to the first vehicle for movement generally about a transverse axis; connecting means adjacent the wheeled support mounting an intermediate portion of the member on the trailer for movement with respect thereto generally about a transverse axis, a rear portion of the member extending rearwardly of the rolling axis of the wheeled support; a support carried on the second vehicle generally above the rear portion of the member; and force-exerting means disposed generally rearwardly of the rolling axis of the wheeled support and connected between the rear portion of the member and the support on the second vehicle for moving the member vertically.

18. A steerable trailer vehicle, comprising steering means capable of steering movement to steer said vehicle, a draft member having a universally articulate connection with said vehicle and projecting horizontally therefrom and operable to impart said steering movement to said steering means when swung horizontally about said connection, force receiving means rigid with said draft member and disposed upon a different side of said connection than that from which the draft member projects as aforesaid, anchorage means on the vehicle in virtually the same vertical plane as said force receiving means, and a device forcibly changeable in length connected between said anchorage means and said force receiving means.

19. A steerable trailer vehicle, comprising steering means capable of steering movement to steer said vehicle, a draft member having a universally articulate connection with said vehicle and projecting horizontally therefrom and operable to impart said steering movement to said steering means when swung horizontally about said connection, force receiving means rigid with said draft member and disposed oppositely of said connection with respect to said draft member and virtually within a common vertical plane therewith, anchorage means on the vehicle virtually within said plane, and a device forcibly changeable in length connected between said anchorage means and said force receiving means.

20. The combination set forth in claim 19 wherein said anchorage means is freely pivotable about an axis intersecting such anchorage means and said universally articulate connection.

LOVEL R. SIMMONS.